US011073836B2

(12) United States Patent
Tiwari et al.

(10) Patent No.: US 11,073,836 B2
(45) Date of Patent: Jul. 27, 2021

(54) VEHICLE SENSOR SYSTEM AND METHOD OF USE

(71) Applicant: Gatik AI Inc., Palo Alto, CA (US)

(72) Inventors: Kartik Tiwari, San Francisco, CA (US); Kevin Keogh, San Francisco, CA (US); Isaac Brown, San Francisco, CA (US); Aishanou Osha Rait, San Francisco, CA (US); Tanya Sumang, San Francisco, CA (US)

(73) Assignee: Gatik AI Inc., Palo Alto, CA (US)

( * ) Notice: Subject to any disclaimer, the term of this patent is extended or adjusted under 35 U.S.C. 154(b) by 10 days.

(21) Appl. No.: 16/238,857

(22) Filed: Jan. 3, 2019

(65) Prior Publication Data
US 2019/0155300 A1   May 23, 2019

Related U.S. Application Data

(63) Continuation of application No. 15/920,884, filed on Mar. 14, 2018, now Pat. No. 10,209,718.
(Continued)

(51) Int. Cl.
*G05D 1/02*   (2020.01)
*H04N 5/232*   (2006.01)
(Continued)

(52) U.S. Cl.
CPC ......... *G05D 1/0246* (2013.01); *G05D 1/0038* (2013.01); *G05D 1/0257* (2013.01);
(Continued)

(58) Field of Classification Search
CPC .. H04N 13/204; H04N 13/243; H04N 13/254; H04N 5/23245; H04N 5/23296;
(Continued)

(56) References Cited

U.S. PATENT DOCUMENTS

| 5,640,323 A | 6/1997 | Kleimenhagen et al. |
| 6,151,539 A | 11/2000 | Bergholz et al. |

(Continued)

FOREIGN PATENT DOCUMENTS

| CN | 111373333 A | * 7/2020 | ............. G01S 17/86 |
| RU | 166811 U1 | 12/2016 | |

(Continued)

OTHER PUBLICATIONS

Milanes Vincente; et al. "Automated On-Ramp Merging System for Congested Traffic Situations", IEEE Transactions on Intelligent Transportation Systems, vol. 12, No. 2, Jun. 2011, pp. 499-508., Feb. 21, 2018.

(Continued)

*Primary Examiner* — Atul Trivedi
(74) *Attorney, Agent, or Firm* — Jeffrey Schox; Caitlin Ploch

(57) ABSTRACT

A system and method for collecting and processing sensor data for facilitating and/or enabling autonomous, semi-autonomous, and remote operation of a vehicle, including: collecting surroundings at one or more sensors, and determining properties of the surroundings of the vehicle and/or the behavior of the vehicle based on the surroundings data at a computing system.

20 Claims, 7 Drawing Sheets

Related U.S. Application Data

(60) Provisional application No. 62/471,088, filed on Mar. 14, 2017, provisional application No. 62/522,303, filed on Jun. 20, 2017.

(51) Int. Cl.
*H04N 5/247* (2006.01)
*H04N 13/204* (2018.01)
*G05D 1/00* (2006.01)
*H04N 13/243* (2018.01)
*H04N 13/254* (2018.01)
*H04N 7/18* (2006.01)

(52) U.S. Cl.
CPC ..... *H04N 5/23245* (2013.01); *H04N 5/23296* (2013.01); *H04N 5/247* (2013.01); *H04N 7/181* (2013.01); *H04N 13/204* (2018.05); *H04N 13/243* (2018.05); *H04N 13/254* (2018.05); *G05D 2201/0213* (2013.01)

(58) Field of Classification Search
CPC ...... H04N 5/247; H04N 7/181; G05D 1/0038; G05D 1/0246; G05D 1/0257; G05D 2201/0213
USPC .......................................................... 701/24
See application file for complete search history.

(56) References Cited

U.S. PATENT DOCUMENTS

| | | |
|---|---|---|
| 7,603,894 B2 | 10/2009 | Breed |
| 7,796,081 B2 | 9/2010 | Breed |
| 8,041,079 B2 | 10/2011 | Chiu et al. |
| 8,271,132 B2 | 9/2012 | Nielsen et al. |
| 8,818,567 B2 | 8/2014 | Anderson |
| 8,843,244 B2 | 9/2014 | Phillips et al. |
| 8,989,972 B2 | 3/2015 | Anderson |
| 9,201,424 B1 | 12/2015 | Ogale |
| 9,323,250 B2 | 4/2016 | Wang et al. |
| 9,432,929 B1 | 8/2016 | Ross et al. |
| 9,494,935 B2 | 11/2016 | Okumura et al. |
| 9,507,346 B1 | 11/2016 | Levinson et al. |
| 9,611,038 B2 | 4/2017 | Dahlstrom |
| 9,630,619 B1 | 4/2017 | Kentley et al. |
| 9,632,502 B1 | 4/2017 | Levinson et al. |
| 9,645,577 B1 | 5/2017 | Frazzoli et al. |
| 9,720,410 B2 | 8/2017 | Fairfield et al. |
| 9,720,415 B2 | 8/2017 | Levinson et al. |
| 9,734,685 B2 | 8/2017 | Fields et al. |
| 9,811,038 B2 | 11/2017 | Tanto |
| 9,964,948 B2 | 5/2018 | Ullrich et al. |
| 10,065,647 B2 | 9/2018 | Tiwari et al. |
| 2007/0154063 A1 | 7/2007 | Breed |
| 2007/0291130 A1 | 12/2007 | Broggi et al. |
| 2008/0216567 A1 | 9/2008 | Breed |
| 2009/0234499 A1 | 9/2009 | Nielsen et al. |
| 2010/0063651 A1 | 3/2010 | Anderson |
| 2010/0097456 A1 | 4/2010 | Zhang et al. |
| 2010/0286845 A1 | 11/2010 | Rekow et al. |
| 2011/0190972 A1 | 8/2011 | Timmons et al. |
| 2012/0316725 A1 | 12/2012 | Trepagnier et al. |
| 2013/0304514 A1 | 11/2013 | Hyde et al. |
| 2014/0316614 A1 | 10/2014 | Newman |
| 2015/0025708 A1 | 1/2015 | Anderson |
| 2015/0094898 A1 | 4/2015 | Tellis et al. |
| 2015/0103159 A1* | 4/2015 | Shashua ............ G06K 9/00791 348/118 |
| 2015/0210274 A1* | 7/2015 | Clarke .................. G08G 1/167 382/104 |
| 2015/0234045 A1 | 8/2015 | Rosenblum et al. |
| 2015/0248131 A1 | 9/2015 | Fairfield et al. |
| 2015/0254955 A1 | 9/2015 | Fields et al. |
| 2015/0254986 A1* | 9/2015 | Fairfield ............... G08G 1/161 707/687 |
| 2015/0344136 A1 | 12/2015 | Dahlstrom |
| 2015/0346724 A1 | 12/2015 | Jones et al. |
| 2016/0046290 A1* | 2/2016 | Aharony ............... B60W 10/04 701/41 |
| 2016/0229342 A1 | 8/2016 | Taylor et al. |
| 2016/0360697 A1 | 12/2016 | Diaz |
| 2016/0370801 A1 | 12/2016 | Fairfield et al. |
| 2016/0379066 A1 | 12/2016 | Reiche et al. |
| 2017/0008521 A1* | 1/2017 | Braunstein ............ G08G 1/167 |
| 2017/0010616 A1 | 1/2017 | Shashua et al. |
| 2017/0045885 A1 | 2/2017 | Okumura et al. |
| 2017/0115387 A1 | 4/2017 | Luders et al. |
| 2017/0120753 A1 | 5/2017 | Kentley |
| 2017/0123419 A1 | 5/2017 | Levinson et al. |
| 2017/0123422 A1 | 5/2017 | Kentley et al. |
| 2017/0123428 A1 | 5/2017 | Levinson et al. |
| 2017/0123429 A1 | 5/2017 | Levinson et al. |
| 2017/0259753 A1* | 9/2017 | Meyhofer ............ H04N 13/204 |
| 2017/0329346 A1 | 11/2017 | Latotzki |
| 2017/0351261 A1 | 12/2017 | Levinson et al. |
| 2018/0024562 A1 | 1/2018 | Bellaiche |
| 2018/0120859 A1* | 5/2018 | Eagelberg ........ B60W 60/0027 |
| 2018/0267558 A1* | 9/2018 | Tiwari ................ H04N 13/204 |
| 2019/0196465 A1 | 6/2019 | Hummelshøj |
| 2019/0258878 A1* | 8/2019 | Koivisto .................. G05D 1/00 |
| 2019/0369637 A1* | 12/2019 | Shalev-Shwartz ........................ G06K 9/00791 |
| 2020/0112657 A1* | 4/2020 | Stein ..................... H04N 7/181 |
| 2020/0125863 A1* | 4/2020 | Shashua ............ G06K 9/00798 |
| 2020/0195837 A1* | 6/2020 | Miu ..................... G02B 27/0075 |
| 2020/0210726 A1* | 7/2020 | Yang ....................... G06N 3/04 |
| 2020/0218979 A1* | 7/2020 | Kwon ................ B60W 60/0011 |
| 2020/0247431 A1* | 8/2020 | Ferencz ............. G06K 9/00798 |
| 2020/0257306 A1* | 8/2020 | Nisenzon ........... G06K 9/00791 |
| 2020/0324761 A1* | 10/2020 | Magzimof .......... G05D 1/0011 |
| 2020/0379108 A1* | 12/2020 | Vijayalingam ........ G06K 9/629 |
| 2021/0064057 A1* | 3/2021 | Eldar .................. G05D 1/0287 |

FOREIGN PATENT DOCUMENTS

| | | |
|---|---|---|
| WO | 2015134311 A1 | 9/2015 |
| WO | 2015166811 A1 | 11/2015 |

OTHER PUBLICATIONS

"Diss Kathryn, Driverless trucks move all iron ore at Rio Tinto's Pilbara mines, in world first, http://www.abc.net.au/news/2015-10-18, 3 pages.", Feb. 21, 2018 00:00:00.0.

* cited by examiner

VEHICLE SENSOR SYSTEM AND METHOD OF USE

CROSS REFERENCE TO RELATED APPLICATIONS

This application is a continuation application of U.S. application Ser. No. 15/920,884, filed 14 Mar. 2018, which claims the benefit of U.S. Provisional Application Ser. No. 62/522,303, filed 20 Jun. 2017, and U.S. Provisional Application Ser. No. 62/471,088, filed 14 Mar. 2017, each of which is incorporated herein in its entirety by this reference.

TECHNICAL FIELD

This invention relates generally to the vehicle operation field, and more specifically to a new and useful sensor system in the vehicle operation field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
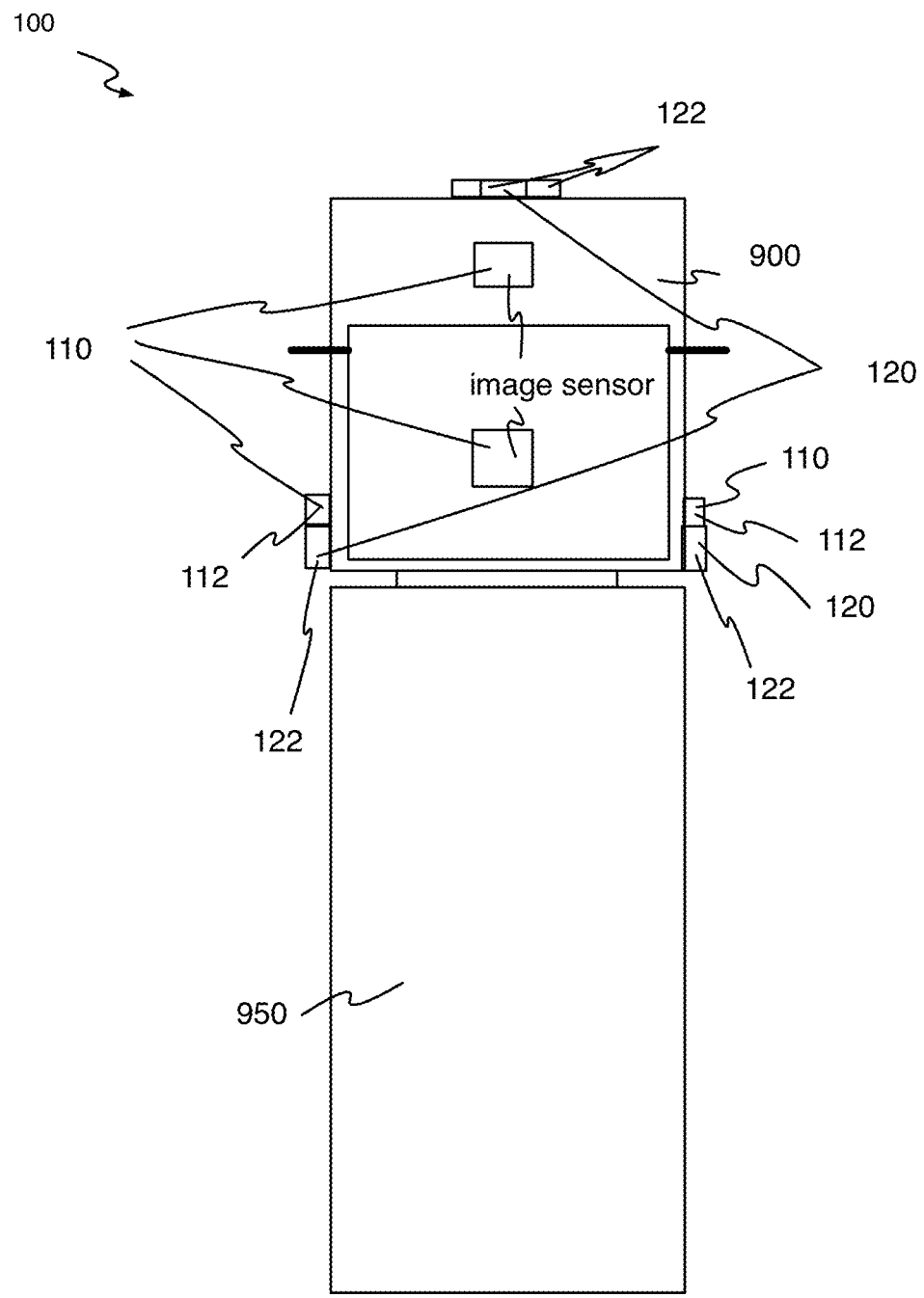
FIG. 1 is a schematic of an embodiment of the system.

As shown in FIG. 1, an embodiment of the system 100 includes an imaging subsystem 110, a rangefinding subsystem 120, and a computing subsystem 130. The imaging subsystem 110 preferably includes a plurality of imaging sensors 112, but can additionally or alternatively include a single imaging sensor 112. The rangefinding subsystem 120 preferably includes a plurality of rangefinders 122, but can additionally or alternatively include a single rangefinder 122. In some embodiments, the system 100 can include an imaging subsystem 110 without a rangefinding subsystem 120, and in some embodiments the system 100 can include a rangefinding subsystem 120 without an imaging subsystem 110. The system 100 can optionally include a control monitoring module 137, a supplementary sensing subsystem 140, and any other suitable subsystem(s) and/or components.

The system 100 functions to enable remote, autonomous, and/or semi-autonomous operation, and/or teleoperation of a motor vehicle. The system 100 can also function to collect sensor data (e.g., image data, 3D point cloud data, mapping data, behavioral data, etc.) of surroundings (e.g., immediate surroundings within 1-2 meters, near-field data within 20 meters, the area within a speed-dependent radius of perception) of a vehicle. The system 100 can also function to reduce network requirements (e.g., bandwidth, latency, quality of service, etc.) by performing sensor fusion at the vehicle. The system 100 can also function to collect sensor data to be used in autonomous driving models. However, the system 100 can have any other suitable purpose and/or function related to vehicle navigation.

Elements of the sensor system (e.g., the image sensors 112, the rangefinders 122, etc.) are preferably arranged to provide imagery representative of the viewable area and perspective of a driver of the vehicle when such a driver is located in a driving position (e.g., in the driver's seat at the left side of a cab of a commercial truck, in the driver's seat in the center of a cab of a commercial truck, in the driver's seat at the right side of a commercial truck, etc.). The system 100 can optionally be arranged to provide point cloud data that is overlapping and/or corresponding to the imaged region (e.g., for training of a local operator, for training a machine learning model, etc.). Alternatively, the system 100 can be arranged to provide any suitable arcsector of coverage, at any range of heights between the driving surface (e.g., the road) and a vertical range limit, with respect to both the imaging subsystem 110 and the rangefinding subsystem 120.

The system 100 preferably includes a single imaging subsystem 110 that preferably includes at least eight imaging sensors 112 (e.g., cameras), as well as a single rangefinding subsystem 120 that preferably includes at least three rangefinders 122 (e.g., rangefinding sensors). The eight imaging sensors 112 preferably include at least two forward facing cameras, and at least one rear and side facing camera associated with each side of the vehicle; however, the eight imaging sensors 112 can additionally or alternatively include any other suitable arrangement of imaging sensors. The three rangefinders 122 preferably include at least one forward facing rangefinder, and at least two side and rear facing rangefinders (e.g., two instances of a rangefinder that encompasses both to the side and to the rear of the vehicle in its area of detection); however, the three rangefinders 122 can additionally or alternatively include any other suitable arrangement of rangefinders. Additionally or alternatively, the system can include any suitable number of imaging and/or rangefinding subsystems having any suitable number of imaging sensors and/or rangefinding sensors, as well as other sensor subsystems having any suitable number of sensors of any suitable type, and arranged in any suitable manner.

The system 100 can be used and/or implemented in conjunction with various related systems and subsystems, including a vehicle 900, an actuation subsystem, and any other suitable vehicle systems. The system 100 can be integrated into the vehicle (e.g., integrated by an original equipment manufacturer/OEM into a truck cab), added onto the vehicle (e.g., by an aftermarket supplier), and/or otherwise suitable coupled to the vehicle. The vehicle 900 is preferably a commercial tractor truck used to couple to and tow a trailer (e.g., a semi-truck, a tractor trailer, etc.), but can additionally or alternatively be any suitable vehicle type (e.g., a consumer vehicle, a passenger vehicle, a sidewalk-traversing vehicle, a velocipede, etc.).

The system 100 can collect actuation data (e.g., state variable values of the actuation subsystem such as steering wheel angular position and/or speed, pedal actuator position and/or speed, voltages and/or currents driving steering and/or pedal actuation subsystems, etc.) from the actuation subsystem, which is preferably utilized to actuate control surfaces and/or elements of the vehicle (e.g., steering wheel, shifter, pedals, wing, spoiler, etc.).

The system 100 can collect and/or generate data that can be streamed off the vehicle (e.g., via a wireless communication link), stored in an onboard memory subsystem, processed onboard and then streamed and/or stored asynchronously (e.g., at a time point later than a collection time point or time period), and/or manipulated in any other suitable manner. Streaming (e.g., transmission) can be performed over a network connection to a communications module associated with the vehicle (e.g., a communications module integrated into the vehicle, a connected mobile device carried within the vehicle, one or more radio communication modules of the vehicle, etc.), or any other suitable communication mechanism.

2. Benefits

Variants of the technology can confer several benefits and/or advantages. First, variants of the system can enable linking of image data that emulates driver-received image data to other collected and/or extracted vehicle data, in order to correlate what a local operator of the vehicle sees to sensor data that is typically unavailable to a driver (e.g., point cloud data, object classification and tracking data, blind spot imagery, etc.). Linking image data in the manner so described can also be used to generate improved decision-making models by training such models with data generated by monitoring expert drivers (e.g., professional truckers, either locally operating the vehicle or teleoperating the vehicle) and correlating imagery data available to the expert drivers to other collected and/or extracted vehicle data (e.g., using a training module).

Second, variants of the technology can augment a conventional vehicle with advanced sensing capability, to be applied to autonomous, semi-autonomous, and/or remote operation of the vehicle.

Third, variants of the technology can use pre-existing optical components of the vehicle to provide imagery data (e.g., rearview mirrors, sideview mirrors, other mirrors and/or cameras, etc.). For example, a first image sensor having a wide angular field of view (AFOV) can be used to collect image data from within a truck cabin, such that reflected images in one or more rear or side-view mirrors are visible within the image data collected by the image sensor. The reflected images in this example can be used to obviate the need for rear and/or side-view image sensors, and/or to validate images or data extracted from images collected from rear and/or side-viewing image sensors (e.g., by comparing a de-warped or otherwise transformed reflected image with a raw image gathered of approximately the same region of space). However, pre-existing optical components of the vehicle can be otherwise suitably used in imaging data collection.

Fourth, variants of the technology can enable teleoperation of a vehicle (e.g., a commercial transportation vehicle) and handoff of vehicle control between operators (e.g., an in-situ driver, a teleoperator, an autonomous control system, etc.) to increase the number of vehicles that a single operator can control (e.g., via teleoperation) and/or reduce the amount of time a human operator needs to spend operating a vehicle. Variants of the system can enable humans already trained in truck-driving (e.g., truck drivers) to easily teleoperate the system, because the imaged region is substantially similar to what an in-situ driver would see from the driver's seat of the vehicle (e.g., truck drivers can teleoperate the truck without substantial additional training, because they are already familiar with the available imagery). For example, these variants can capture and/or provide videos or other optical measurements with the same or similar field of view as that of an in-situ driver (e.g., videos having a limited AFOV, videos encompassing vehicle fiducials, such as the vehicle hood, dash, or steering wheel, etc.). These variants can optionally include recording sensor measurements associated with haptic feedback (e.g., road feel, steering wheel torque or weight, etc.) and feeding and/or generating haptic feedback at the teleoperator's input mechanisms. Variants of the system can optionally be configured to enable an in-situ driver to drive the vehicle without impeding sensor measurement capture. Variants of the system can also enable active teleoperation of the vehicle during distinct stages of operation (e.g., surface street navigation, loading dock navigation, trailer yard navigation, etc.) and limited, primarily passive teleoperation (e.g., monitoring and occasional active supervision and/or control) during less activity-intensive driving stages (e.g., highway operation).

Fifth, the technology can confer improvements in computer-related technology (e.g., vehicle telematics, computational modeling associated with vehicle control, etc.) by leveraging non-generic data (e.g., video data, range data), motion data (e.g., accelerometer data, gyroscope data), and/or other suitable data from a plurality of sensors (e.g., non-generalized localization and mapping sensors for vehicle applications) to improve accuracy of determining characteristics of vehicle surroundings (e.g., detecting the presence objects in the vicinity of the vehicle, foreign vehicles in regions around the vehicle, lane line locations on the roadway, etc.) and/or vehicle movement characteristics (e.g., which can thereby enable appropriately generated and/or timed vehicle control inputs).

Sixth, the technology can automatically perform actions (e.g., control sensors, control actuation interfaces to operate the vehicle, etc.) based on determined confidence metrics that facilitate improved accuracy, processing, and gathering-efficiency of surroundings data. For example, surroundings data collection can be halted in whole or in part in response to detection that the vehicle is driving in a manner that obviates the need for some data collection (e.g., away from a side of the vehicle at which a portion of the surroundings data is being collected). In another example, driving guidance (e.g., to improve safety, fuel efficiency, navigation efficiency, etc.) can be provided in real-time to a remote operator based on a combination of determining that the vehicle is entering or has entered an unfamiliar situation and/or location.

Seventh, the technology can provide technical solutions necessarily rooted in computer technology (e.g., determining confidence metrics describing collected surroundings data based on extracted object parameters; utilizing different computational models to determine vehicle surroundings characteristics based on the collected sensor data; utilizing computational models to determine vehicle control inputs based on sensor data, etc.) to overcome issues specifically arising with computer technology (e.g., issues surrounding how to leverage a large quantities of high resolution imagery and range data; issues surrounding efficiently processing and/or ignoring portions of the collected data in cases wherein processing resources are limited; etc.). In another example, the technology can apply computer-implemented rules (e.g., feature extraction for processing image data and/or range data into an operable form for determining the presence of objects depicted by the data and/or characteristics of the objects; etc.).

Eighth, the technology can confer improvements in the functioning of computational systems themselves. For example, the technology can improve upon the processing of collected non-generic data (e.g., collected in conjunction with autonomous, semi-autonomous, and/or remote vehicle operation) by improving selection of data to be processed based on vehicle motion (e.g., ignoring and/or ceasing collection of image data or range data collected from a region of the vehicle surroundings that the vehicle is moving away from, etc.).

Ninth, the technology can amount to an inventive distribution of functionality across a network including a one or more computing subsystems onboard a vehicle, and a vehicle operation system (e.g., a remote computing system, a remote teleoperation system, etc.), where, for example, vehicle operation functionality can be performed by the one or more computing subsystems, and supervision of vehicle operation, assistance of vehicle operation, and/or handoff of vehicle operation can be performed by the vehicle operation system. In examples, functionality associated with portions of the method 200 can be distributed in any suitable manner (e.g., where the remote computing system can determine object characteristics or localization parameters, confidence metrics, navigation instructions, etc.).

Tenth, the technology can leverage specialized computing devices (e.g., an onboard computing system with GPS location capabilities and surroundings data processing capabilities; rangefinders with automatic object detection and tracking capabilities, control input monitoring subsystems, etc.) to collect specialized datasets for subsequent processing.

However, variants of the technology can afford any other suitable benefits and/or advantages.

3. System

The system 100 preferably includes: an imaging subsystem 110, a rangefinding subsystem 120, and a computing subsystem 130. The system 100 functions to enable autonomous, semi-autonomous, and remote operation of a vehicle.

3.1 Imaging Subsystem

Figure 3:
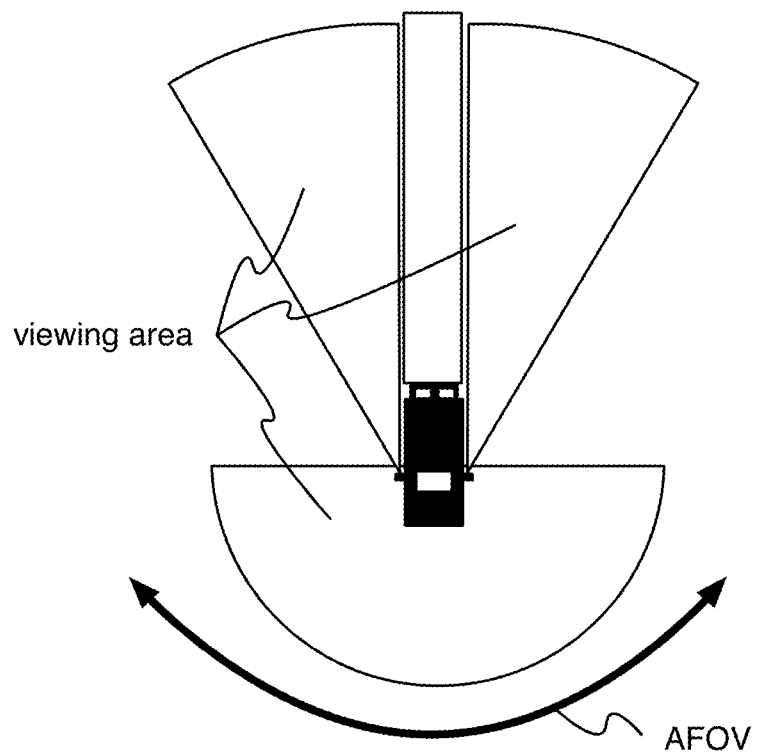
FIG. 3 is a schematic of a specific example configuration of a portion of an imaging subsystem of an embodiment of the system.

The imaging subsystem 110 functions to collect image data from the area in the vicinity of the vehicle (e.g., the surroundings of the vehicle). Such image data can be used to directly operate the vehicle (e.g., as input to an autonomous driving module of an onboard computing system), provided to a remote entity that is directly controlling the vehicle (e.g., a teleoperator), provided to a remote entity that is monitoring vehicle operation. The imaging subsystem 110 can also function to collect image data that emulates the imagery available to a human driver of the vehicle (e.g., a substantially identical viewing area including the frontal viewing area through the front and side windows and the rear viewing areas reflected in the rear-view mirrors of the vehicle). In a specific example, as shown in FIG. 3, the imaging system includes a single panoramic camera that captures an AFOV towards the front of the vehicle (e.g., a 180° field of view) as well as viewing areas towards the rear of the vehicle by way of reflections in the rear view mirrors of the vehicle. In a first variation, portions of the vehicle are encompassed in the FOV of the imaging subsystem (e.g., the hood of the truck cab is visible in the front facing camera, and sides of the trailer are visible in the side and/or rear facing cameras). These vehicle portions can be used as calibration points for computer vision processes (e.g., wherein a known vehicle portion distance, dimension, or other parameter is used to calibrate or as a reference for another optical feature), as driver reference points, or otherwise used. However, the imaging subsystem 110 can be arranged in any other suitable configuration, with the respective field of view encompassing any other suitable region.

The imaging subsystem 110 is preferably connected to the vehicle (e.g., mounted to the vehicle), and communicatively coupled to the rangefinding subsystem 120 (e.g., by way of an onboard computing system, a control module, and/or centralized data collection and processing system, for use in sensor fusion between the imaging and rangefinding subsystems, training models based on the imagery data using the rangefinding data, etc.). Portions of the imaging subsystem no (e.g., individual image sensors 112) are preferably located proximal corners of the external surfaces of the vehicle in order to capture imagery of the surroundings; however, the imaging subsystem 110 and portions thereof can additionally or alternatively be arranged at any suitable location relative to the vehicle (e.g., within the cab and/or vehicle interior, arranged to avoid occupants blocking the field of view of the camera or cameras, etc.). In a specific example, a set of image sensors 112 are rigidly coupled to a horizontal beam extending between the left and right interior sides of the vehicle cabin, wherein each of the set of image sensors 112 are spaced a predetermined and fixed distance apart and oriented towards the forward direction (e.g., to enable stereoscopic imaging between multiple cameras having overlapping AFOVs). The imaging subsystem 110 can include one or more image sensors 112, and can optionally include an image processor and any other suitable components.

The image sensors 112 of the imaging subsystem 110 function to record image data. The image sensors can also function to collect and/or record image data that corresponds to imagery (e.g., to the viewing area, AFOV, etc.) available to an in-situ human driver. The image sensors 112 can have any suitable imaging characteristics, wherein such characteristics can include viewing angle and/or field of view (e.g., 180°, 90°, centered towards the front of the vehicle, offset, etc.), wavelength sensitivity (e.g., visible light, infrared, ultraviolet, etc.), color sensitivity (e.g., full color spectrum, black and white, etc.), resolution (e.g., 1080p, ultra-HD, 4k, regular definition, etc.), framerate (e.g., high frame rate, 40 frames per second, 100 frames per second, 10 frames per second, etc.), optical distortion (e.g., 1:1 image and object mapping, fisheye distortion, etc.), and any other suitable characteristics related to image properties and/or imaging properties. Image sensors 112 are preferably fixed (e.g., with a constant field of view), but can additionally or alternatively be movable (e.g., scanning, controllable, motorized, manually adjustable, etc.). In some examples, one or more image sensors 112 can include a stereoscopic camera. In further examples, one or more image sensors 112 can include a camera having a variable focal length (e.g., an optical zoom capability), which can be manually or automatically adjustable.

Figure 2:
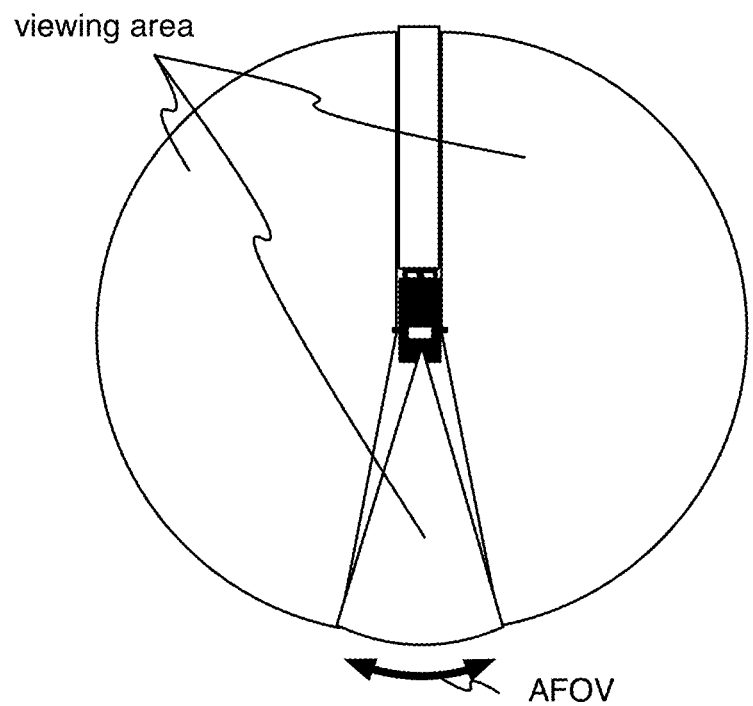
FIG. 2 is a schematic of a specific example configuration of a portion of an imaging subsystem of an embodiment of the system.

The image sensors 112 can be coupled to the rangefinding subsystem 120 (e.g., physically coupled in arrangements wherein the rangefinders and image sensors are located at substantially the same locations relative to the vehicle, such as a side-view mirror stem), and are preferably coupled to the vehicle (e.g., mechanically coupled to and supported by the vehicle, communicatively coupled to in order to transmit data to and receive data from the vehicle, etc.). The image sensors 112 can be any suitable type of image sensor, such as a panoramic camera (e.g., a single panoramic camera located in the truck cab that views a 180° area centered at the front of the vehicle, and includes the reflections of the left and right rear view mirrors), a stereocamera, as well as other camera types. For example, as shown in FIGS. 1 and 2, the image sensors can include a forward facing camera located on the hood and/or within the interior (e.g., on the dashboard) of the vehicle proximal the windshield that has a viewing angle (e.g., cone) having an angular field of view (e.g., 32.8 degrees) centered along the vehicle longitudinal axis defined between the fore and aft ends of the vehicle, as well as a first wide angle camera attached to each mirror support that has a viewing angle (e.g., a 170° viewing angle) with a first edge (e.g., extent) adjacent to a side of the vehicle (e.g., a trailer 950 of the vehicle) and a second edge that partially overlaps with the viewing angle edge of the forward facing camera. In a second example, the image sensors can include a teleoperation camera (e.g., wide angle camera) mounted within the cab at head height and centered within the cab and a set of stereocameras mounted to the top of the cab exterior. In this example, the signals from the teleoperation camera can be used for both teleoperation and automated vehicle control, while the signals from the stereocameras can be used for automated vehicle control.

Image sensors 112 can be adjustable. Adjustable features of the image sensors 112 can include the orientation (e.g., angular position and associated view of a scene), focal length (e.g., via a zoom lens), wavelength sensitivity (e.g., between night vision and normal vision sensitivity), and any other suitable image sensor characteristics. In examples, image sensors 112 can be manually adjustable, automatically adjustable, and/or adjustable in response to received instructions. In a specific example, an image sensor (e.g., a forward camera) is adjustable based on an instruction set received from a remote operator (e.g., a teleoperator). In a related specific example, the received instruction set is automatically generated based on the head position of the remote operator (e.g., the orientation of the camera tracks the orientation of the gaze of the remote operator). However, adjustable image sensors 112 can be otherwise suitably adjusted.

Figure 10:
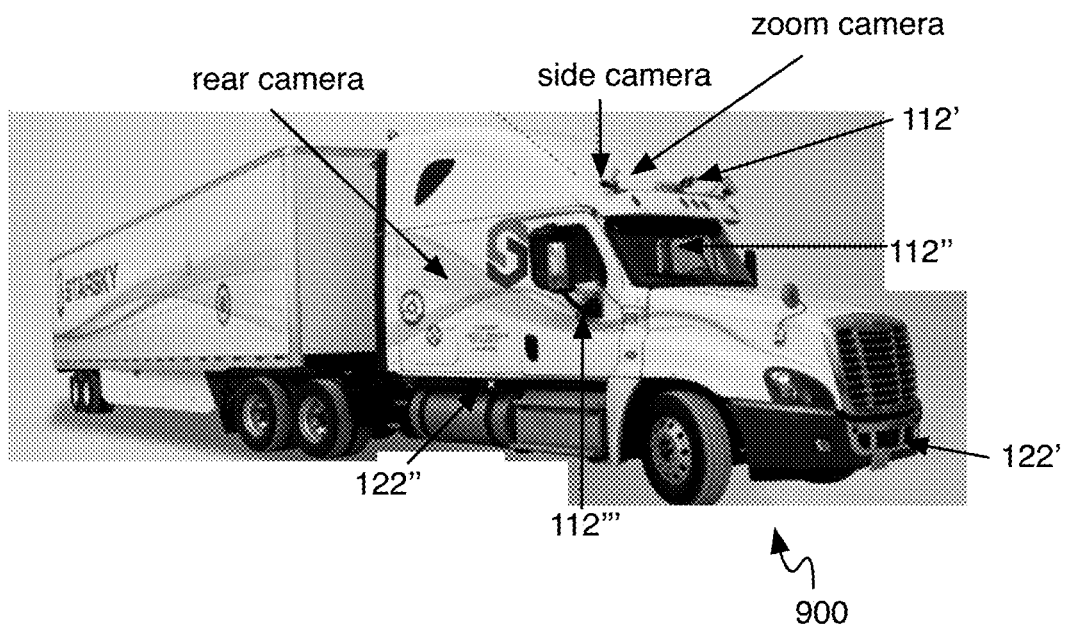
FIG. 10 is a depiction of an example arrangement of image sensors and rangefinders of the imaging subsystem and rangefinding subsystem, respectively, of an example embodiment of the system.

In a specific example, as shown in FIG. 10, the imaging subsystem 110 includes: a first forward camera 112', arranged exterior to a cabin of the vehicle superior to a windshield of the vehicle and aligned along a centerline of a longitudinal axis of the cabin, that outputs a first video stream, wherein the first forward camera defines a first AFOV and a first focal length (FL); and, a second forward camera 112", arranged interior to the cabin proximal an upper portion of the windshield and aligned along the centerline, that outputs a second video stream, wherein the second forward camera defines a second AFOV narrower than the first AFOV. In this specific example, the imaging subsystem 110 further includes: a side camera 112''', mounted to a side mirror stem of the vehicle and defining a third AFOV oriented toward a rear direction relative to the vehicle, and operable between an on-state and an off-state, wherein in the on-state the side camera outputs a third video stream and in the off-state the side camera is inoperative.

Figure 8:
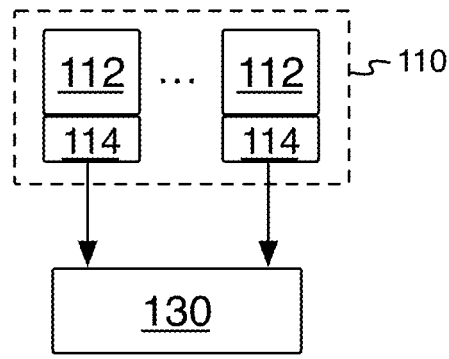
FIG. 8 is a schematic of a portion of an example embodiment of the system.

As shown in FIG. 8, the imaging subsystem no can optionally include one or more image processors 114, which functions to process the image data in-situ at the image sensor (e.g., via a system-on-chip integrated with the image sensor). The image processor 114 can also function to un-distort (e.g., dewarp, denoise, reverse transform, etc.) images that are collected via an image sensor that collects a distorted image (e.g., an image sensor that includes a fisheye lens, a panoramic camera, etc.). The image processor is preferably integrated with an image sensor (e.g., as an integrated electro-mechanical optics package), but can additionally or alternatively be configured as a hub connected to each image sensor in a set of image sensors of the imaging subsystem (e.g., an image processing module communicatively coupled to a control module and to each image sensor).

The image sensors 112 are preferably operable between various operating modes, including a continuous acquisition mode, a burst acquisition mode, and an ad hoc single frame mode. The continuous acquisition mode can include recording video at a frame rate (e.g., outputting a video stream). The frame rate is preferably adjustable (e.g., based on operator instructions, instructions from a control module, etc.), but can alternatively be fixed. The burst acquisition mode can include acquiring a sequence of images (e.g., a ten-image burst at a higher framerate than in the continuous acquisition mode, a short video sequence, etc.). Acquiring the sequence can be performed according to a schedule, in response to received instructions, in response to a trigger, and/or in response to any other suitable event. The ad hoc single frame mode preferably includes capturing a single frame, and can include capturing the frame based on received instructions, an object entering within a specified range of the vehicle (e.g., capturing an image that is triggered by a vehicle sideswiping the truck and then fleeing the scene, to enhance vehicle security), and/or any other suitable basis or trigger. However, the image sensors can be operable between any suitable operating modes.

Figure 5:
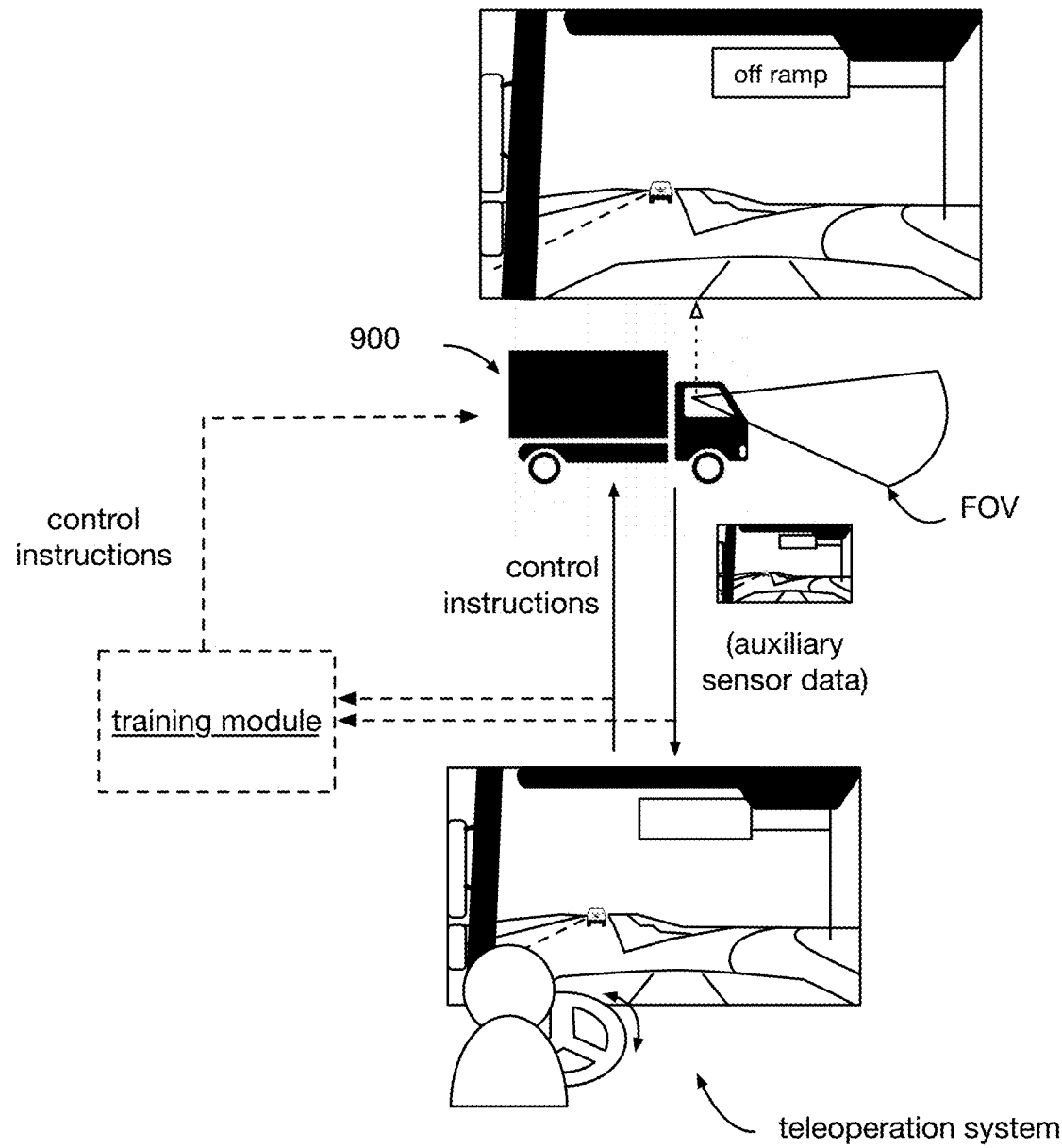
FIG. 5 is a flow chart of an example implementation of a method of use of the system.

The imaging subsystem 110 is preferably operable between various operating modes, including a computer vision mode and a training mode. The computer vision mode can include object recognition, object classification, object labeling, and any other suitable actions related to computer vision. As shown in FIG. 5, the training mode can include correlating and/or synchronizing imaging data (e.g., images, videos) with rangefinding data (e.g., three dimensional data that renders the vehicle surroundings) and vehicle control monitoring data (e.g., data collected that is indicative of the state of the vehicle control systems) to produce a mapping of operator actions (e.g., human driver manual inputs, teleoperator remote inputs, etc.) to rangefinding sensory input (e.g., in order to train a model of expert human operator behavior). However, the imaging subsystem can be otherwise operable between any suitable operating modes.

In another specific example, the imaging subsystem 110 includes a low resolution camera having a 180° viewing angle that faces forward, and two low resolution fisheye cameras having 130° viewing angles that image the areas to the sides of the vehicle. The low resolution imagery is transmitted to a teleoperator at a remote location. In this example, the imaging subsystem further includes a high resolution front facing camera and a plurality of high resolution side-facing cameras that have narrower fields of view than the low resolution image sensors, and collect imagery that is used for object classification, recognition, and tracking.

3.2 Rangefinding Subsystem

The rangefinding subsystem 120 functions to collect range data defining distance(s) between objects and/or surfaces in the vicinity of the vehicle and the vehicle itself, for use in localizing the vehicle during operation. The rangefinding subsystem 120 can also function to generate a three-dimensional dataset of object surface distances from the vehicle and/or positions relative to the vehicle. The rangefinding subsystem 120 is preferably connected to the vehicle, and communicatively coupled to the imaging subsystem 110 (e.g., synchronized in time with the imaging subsystem, participating in sensor fusion with the imaging subsystem, etc.).

The rangefinding system 120 preferably defines a field of view (e.g., defined by a ranging length and a ranging angle), which can have any suitable relationship to the field of view defined by the imaging subsystem (e.g., overlapping, non-overlapping, coextensive, etc.). In a first variation, the rangefinding subsystem 120 and imaging subsystem 110 have a 1:1 mapping (e.g., rangefinders and image sensors are mounted to substantially similar locations on the vehicle, each rangefinder and image sensor collecting data from substantially the same AFOV and ranging length/focal length). In other variations, the total region monitored by the rangefinding subsystem can be different than the total region monitored by the imaging subsystem. In such variations, rangefinders 122 and image sensors 112 can be mounted in different locations (e.g., the image sensors of the imaging subsystem are front-facing only, capturing images from the mirror reflections of the rear view mirrors, and the rangefinding subsystem includes radar transceivers that are both front-facing and rear facing).

The rangefinding subsystem 120 and portions thereof are preferably attached to external surfaces of the vehicle; additionally or alternatively, the rangefinding subsystem and/or portions thereof can be attached to internal surfaces of the vehicle. Components of the rangefinding subsystem 120 can be collocated with corresponding components of the imaging subsystem 110 (e.g., a rangefinder can be collocated with the camera having a shared AFOV; the rangefinder and camera can have the same viewing angle and differing ranging/focal lengths, be directed in substantially the same direction, etc.), can be separately arranged, or be otherwise suitably arranged.

In a specific example, as shown in FIG. 10, the rangefinding subsystem 120 includes a forward radar module 122', coupled to an exterior surface of the vehicle and defining a first ranging length greater than the maximum focal length of any forward-facing image sensors. The forward radar module in this example outputs an object signature, indicative of any objects within the AFOV and ranging length (e.g., detection region) of the radar module that possess a large enough radar cross section to reflect radio waves emitted by the radar module. In this example, the rangefinding subsystem 120 includes a side radar module 122", mounted at an external surface of the vehicle below the door at the side of the vehicle, that outputs a second object signature (e.g., wherein the scoring module outputs a confidence metric based on both object signatures).

Figure 4:
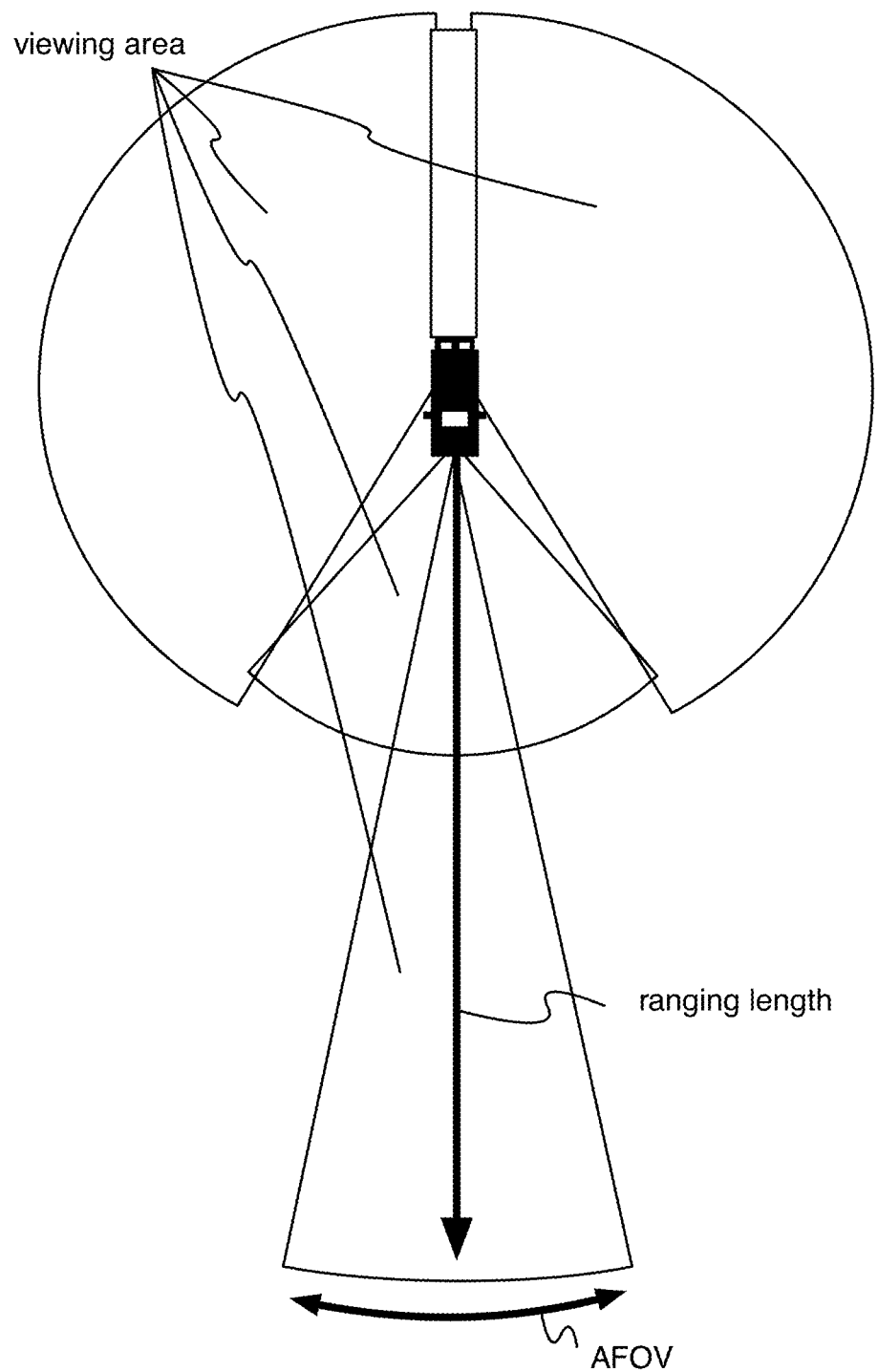
FIG. 4 is a schematic of a specific example configuration of a rangefinding subsystem of an embodiment of the system.

In another specific example, as shown in FIG. 4, the rangefinding subsystem 120 includes a first front facing radar (e.g., forward radar module) having a first ranging length (e.g., 60 meters) and a viewing cone (e.g., a 90° viewing cone) centered along the longitudinal axis of the vehicle. In this example, the rangefinding subsystem also includes a second front facing radar having a second ranging length (e.g., 175 meters) and a second viewing cone (e.g., a 22° viewing cone) likewise centered. This example further includes a first side facing radar having a third range (e.g., 80 meters) and a third viewing cone (e.g., a 150° viewing cone), wherein a first edge of the viewing cone is substantially aligned with the side of the vehicle (e.g., a side of the trailer of the vehicle) and a second edge of the viewing cone extends to a first edge of the viewing cone of the first front facing radar. This example further includes a second side facing radar, configured in a symmetric manner at an opposing side of the vehicle. In alternative examples, the viewing cones can be overlapping. In further alternatives, the rangefinding subsystem can include any suitable number of rangefinders, having any suitable ranges and/or viewing cones, with any suitable degree of overlap (e.g., percentage overlap).

Each rangefinder 122 of the rangefinding subsystem 120 functions to measure the physical distance between the vehicle and at least one point on an object. The rangefinders 122 can also function to measure the physical distance between the vehicle and a set of points (e.g., by simultaneously finding the range at multiple points, by scanning a single point measurement over a projected area, etc.). In specific examples, the rangefinders can include radar transceivers, time of flight (ToF) laser rangefinders, LiDAR (e.g., coherent, incoherent, scanning, non-scanning, etc.), ultrasonic ranging modules (e.g., sonar, echo sounding modules, etc.), and any other suitable rangefinding mechanisms.

The rangefinding subsystem 120 can be operable between several operating modes, including a spatial rendering mode and a training mode. In the spatial rendering mode, the rangefinding subsystem 120 preferably performs integrated sensor fusion of multi-point rangefinding data into output that resembles camera output (e.g., imagery) and includes an additional spatially correlated data axis (e.g., including the range to each point in the image-like data. In the spatial rendering mode, the rangefinding subsystem 120 preferably outputs an object signature representative of any objects within the viewing area of the rangefinding subsystem. The training mode includes correlating and/or synchronizing rangefinding data with imaging data and vehicle control monitoring data to produce a mapping of human driver actions to rangefinding sensor input (e.g. range data), in order to train a machine learning model (e.g., a model of expert human driver behavior). However, the rangefinding subsystem can be otherwise operable between any suitable operating modes.

3.3 Computing System

Figure 9:
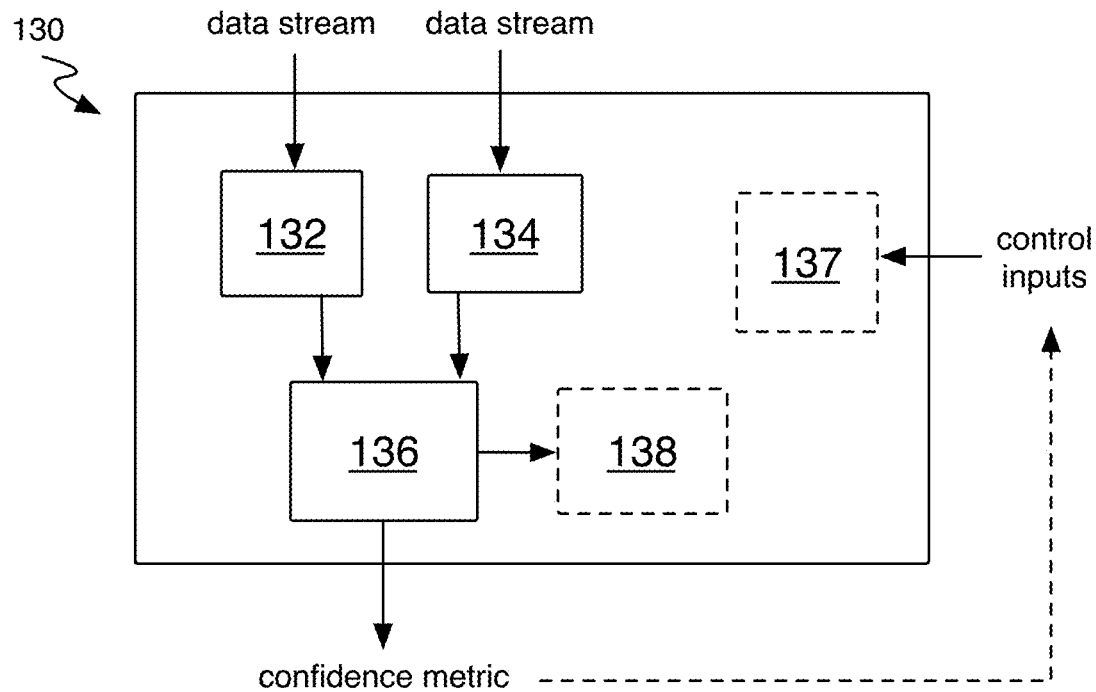
FIG. 9 is a schematic of an example configuration of an onboard computing system of an embodiment of the system.

The system 100 preferably includes an onboard computing subsystem 130 that functions to perform computations associated with the surroundings data collected by the imaging and/or rangefinding subsystems. As shown in FIG. 9, the onboard computing subsystem 130 preferably includes a central processing unit (CPU) 132, a graphical processing unit (GPU) cluster 134, and a scoring module 136. However, the onboard computing subsystem can include one or more CPUs, GPUs, TPUs, microprocessors, memory, or any suitable computing component connected to one or more subcomponents (e.g., sensors) of the imaging subsystem 110 and/or rangefinding subsystem 120 in series, parallel, or in any suitable configuration. The onboard computing subsystem 130 can optionally include: a control monitoring module 137, an alert module 138, and/or any other suitable components. The onboard computing system 130 is preferably operable to perform any of the portions of the method 200 as described below in Section 4; however, the onboard computing system 130 can be otherwise suitably operable.

In variations, the onboard computing system 130 can control sensor operation based on vehicle behavior. For example, the onboard computing system 130 can cease data collection (e.g., operate a camera into an off-state) at a specific sensor (e.g., a side camera) in response to vehicle behavior obviating the need for data collection at the specific sensor (e.g., vehicle motion away from the side direction).

The central processing unit (CPU) 132 functions to perform processing operations suitable for serialized processing (e.g., deterministic processing, rule-based processing, linear transforms, etc.) on one or more data streams received from the imaging subsystem 110 and/or rangefinding subsystem 120. The CPU 132 preferably processes a first image stream (e.g., a forward-facing exterior camera video stream) to extract features of objects in the image(s) of the image stream (e.g., an object localization parameter). The CPU 132 can process additional image streams (e.g., a side-facing camera video stream) simultaneously (e.g., via combination into a single image stream, via computational load splitting, etc.) to extract features of object(s) in the image(s) of the image streams, and in some examples can toggle processing of additional image streams on and off based on vehicle behavior (e.g., toggling processing of side-facing camera video streams 'off' based on vehicle motion away from the side to which the camera faces, based on remote teleoperator instructions to move away from said side, etc.). The CPU 132 can additionally or alternatively process image-like data received from rangefinders (e.g., operative in the spatial rendering mode) a in substantially identical manner as described above in relation to image data. In a specific example, the CPU 132 outputs an object localization dataset (e.g., foreign vehicle location, lane demarcation data, roadway shoulder location, etc.) computed from a data stream (e.g., video stream, image-like data stream, etc.) using a gradient-based feature extraction ruleset (e.g., histogram oriented gradients, edge-detection, etc.). However, the CPU 132 can output any suitable feature value. Alternatively or additionally, the CPU (or any computing subsystem component) can not process the rangefinding subsystem output.

The graphical processing unit (GPU) cluster 134 functions to perform processing operations suitable for parallelized processing (e.g., graphical processing, machine-learning based model execution, deep learning model execution, etc.) on one or more data streams received from the imaging subsystem 110 and/or rangefinding subsystem 120. The GPU cluster 134 can additionally or alternatively process image-like data received from rangefinders (e.g., operative in the spatial rendering mode) in a substantially identical manner as described above in relation to image data. In a specific example, the GPU cluster 134 outputs an object localization dataset (e.g., foreign vehicle location, lane demarcation data, roadway shoulder location, etc.) computed from a combined data stream (e.g., multiple video streams, multiple image-like data streams, etc.) using a trained machine-learning model (e.g., deep learning model, neural network based model, etc.).

The scoring module 136 functions to generate a confidence metric (e.g., confidence score, score) associated with the processed data (e.g., outputs of the CPU and/or GPU cluster). The confidence metric can be any suitable metric describing confidence in the quality of the data collected by the imaging subsystem and/or ranging subsystem, and/or processed by the processing module(s) (e.g., the CPU, GPU cluster, etc.). The quality of the surroundings data is preferably related to the usability of the surroundings data for localization, mapping, and/or control of the vehicle, but can additionally or alternatively be any other suitable quality of the data (e.g., consistency, transmittability, processability, etc.). The confidence metric is preferably expressed as a quantified confidence (e.g., 50% confident, 90% confident, 5% confident, etc.), but can additionally or alternatively be expressed as a binary confidence (e.g., confident or not confident), a qualitative confidence (e.g., very confident, somewhat confident, not at all confident, etc.), and/or by any other suitable expression. The confidence metric can describe the entirety of the data (e.g., all collected surroundings data), specific features within the data (e.g., extracted objects, determined object localization parameters, etc.), types of surroundings data (e.g., a higher confidence in range data than image data), and any other suitable portion or aspect of the surroundings data. The scoring module 136 can output a plurality of confidence metrics, each metric associated with a distinct data characteristic; for example, the scoring module 136 can generate a first confidence metric associated with the transmissibility (e.g., ability to transmit) of the data, a second confidence metric associated with the processability (e.g., ability to process and/or extract object parameters) of the data, and a third confidence metric associated with the quality of the surroundings data (e.g., the spatial resolution, the temporal resolution, etc.) in relation to control of the vehicle and/or perception of the surroundings. The confidence metric can be generated based on one or more outputs of one or more processing modules (e.g., as described above; a comparison between a first and second output; an object localization parameter, an object signature, etc.), and/or otherwise suitably generated.

Figure 7:
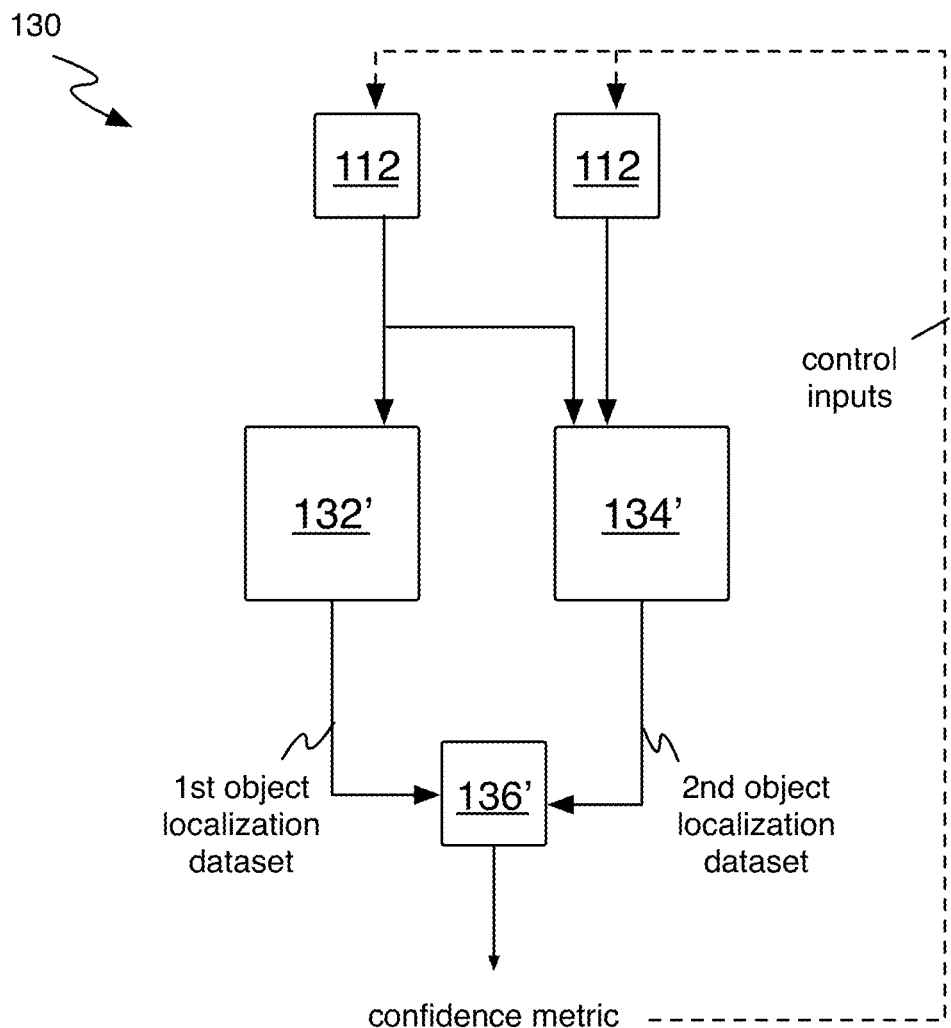
FIG. 7 is a schematic of an example architecture of an onboard computing system of an embodiment of the system.

In a specific example, as shown in FIG. 7, the onboard computing system 130 includes: a central processing unit (CPU) 132' that continuously processes a first video stream (e.g., from a first image sensor) and outputs (e.g., using a deterministic module) a first output (e.g., first object localization dataset); a graphical processing unit (GPU) cluster 134' that continuously processes the first video stream and a second video stream (e.g., from a second image sensor), in parallel to and simultaneously with the CPU, and outputs (e.g., using a deep learning system) a second output (e.g., second object localization dataset); and, a scoring module 136' that generates a first comparison between the first object localization dataset and the second object localization dataset, and outputs a confidence metric based on the comparison and an object signature (e.g., from a rangefinder).

In one example, the vehicle control system (e.g., automatic vehicle control system) can preferentially use the second output for automated vehicle control when the confidence metric satisfies a first condition (e.g., surpasses a threshold value), and preferentially use the first output for automated vehicle control when the confidence metric satisfies a second condition (e.g., falls below the threshold value). In some variants, this architecture can enable the vehicle control system to leverage a faster processing architecture (e.g., the deep learning system) during typical use, but be able to fall back on a slower, but more reliable, processing architecture (e.g., the deterministic system) when the confidence level falls below a threshold level. The confidence metric can optionally be used to tag data associated with (e.g., concurrently recorded with source data resulting in) low confidence metrics (e.g., low confidence metrics for the deep learning models, etc.), which can subsequently be used to train the modules (e.g., deep learning models). Alternatively, the confidence metric can be used to identify and/or reinforce models that should be reinforced (e.g., wherein the system automatically generates a preference for models that generate outputs with high confidence metrics). However, the confidence metric can be otherwise used.

The onboard computing subsystem 130 can optionally include a control monitoring module 137 that functions to collect and log data indicative of the state of vehicle control interfaces (e.g., vehicle control data) during vehicle operation. The control monitoring module 137 can also function to transmit vehicle control data away from the vehicle (e.g., to a teleoperation system, to a fleet monitor, etc.). The control monitoring module 137 can also function to record and/or store vehicle control data on the vehicle (e.g., in a "black-box" recorder, a cockpit and/or truck cab voice and data recorder, etc.). Vehicle control interfaces from which vehicle control data can be collected can include the steering column (e.g., the steering column itself, the steering wheel, etc.), the transmission (e.g., the transmission itself, the clutch pedal, the shifter, etc.), the throttle (e.g., the throttle itself, the gas pedal, etc.), the brakes (e.g., the brake mechanisms themselves, such as calipers and/or drums, the brake pedal, etc.).

The onboard computing subsystem 130 can optionally include an alert module 138 that functions to generate a local alert (e.g., an alert in the vicinity of the vehicle, within 50 yards of the vehicle, within 500 yards of the vehicle, etc.) based on the confidence metric in order to warn surrounding entities (e.g., autonomous vehicles, human drivers, etc.). The alert signature is preferably an audible signature (e.g., a siren, a horn, a klaxon, etc.), but can additionally or alternatively include a visible signature (e.g., a strobe, a spotlight, a rotating beam, emergency flashers, etc.), a wirelessly transmitted data signature (e.g., a ping, a message, an SOS signal, etc.), and/or any other suitable signature. In a specific example, the alert module 138 automatically engages the horn and the emergency flashers in response to the confidence metric falling below a threshold value (e.g., 90%, 80%, 50%, 15%, "very confident", "confident", etc.).

3.4 Supplementary Sensing Subsystem

The system 100 can optionally include a supplementary sensing subsystem 140 that functions to collect data pertaining to the surroundings of the vehicle. The supplementary sensing subsystem can also function to collect supplementary data that can be used as a basic for collecting data from the rangefinding subsystem and/or imaging subsystem (e.g., to detect a trigger event). The supplementary sensing subsystem can include one or more environmental sensors (e.g., temperature sensors, audio sensors, humidity sensors, light sensors, etc.), location sensors (e.g., a GPS module, a dead-reckoning module, etc.), inertial sensors (e.g., gyroscopes, inertial measurement units, etc.), and any other suitable sensors. The supplementary sensing system, in variations, can be physically supported by the vehicle (e.g., affixed to, attached to, contained by, carried by, etc.). Portions of the supplementary sensing subsystem (e.g., sensors of the supplementary sensing subsystem) can be distributed within and upon various portions of the vehicle in any suitable manner. For example, audio sensors (e.g., microphones) can be attached to the inside of the cab at or near the average height of an adult human seated in the driver's seat to facilitate ambient spoken word detection. In another example, a temperature sensor can be arranged at or near an engine block of the vehicle to enable temperature measurement at a position likely to experience high temperatures of which an operator (e.g., an in-situ driver, a teleoperator) should be alerted. However, the supplementary sensing system can be otherwise suitably arranged relative to the vehicle.

The supplementary sensing subsystem can be operable between several operating modes, including a navigation mode. The navigation mode can include continuously updating the vehicle's position on a virtual map (e.g., rendered to a teleoperator at a remote location, rendered to an in situ driver on a mobile device in the vehicle interior, etc.) using a GPS module of the supplementary sensing subsystem. However, the supplementary sensing subsystem can be otherwise operable between any suitable operating modes.

The sensor system can be operable between several operating modes, including an autonomous mode, a teleoperation mode, and a semi-autonomous mode. The autonomous mode preferably includes collecting sensor data (e.g., image data, rangefinding data) and processing the sensor data onboard the vehicle. The autonomous mode can additionally or alternatively include implementing computer- and/or machine-vision algorithms implemented at the vehicle (e.g., a control module of the vehicle) in order to generate outputs based on the sensor data, and providing the outputs to an actuation subsystem to control the vehicle autonomously. In a specific example, the autonomous more includes collecting data at the imaging subsystem and the rangefinding subsystem, and processing the data at a vehicle control module, and implementing a set of rules to extract features from the data (e.g., recognizing objects, classifying objects, tracking object trajectories, etc.). In this example, the autonomous mode further includes collecting GPS data at the supplementary sensing subsystem and providing the GPS data to the control module, which synthesizes the GPS, imagery, and rangefinding data to navigate the vehicle autonomously along a portion of a highway between an onramp and a target offramp.

The teleoperation mode can include collecting sensor data onboard and transmitting sensor data and/or derived data to a remote operator. Derived data can include sensor data from which certain data components are retained and other data components are discarded, extracted data (e.g., object recognition and/or classification) that is at a reduced size and/or complexity than the collected data to render the data more efficiently transmittable, sensor data for which the sampling resolution (e.g., bitrate, framerate, resolution) has been reduced, and any other suitable data derived from the sensor data. The remote operator can be presented with the sensor data in a configuration substantially similar to (e.g., emulating) the in-situ configuration, or be arranged in a different configuration. For example, as shown in FIG. 5, the remote operator's steering wheel can be placed in the same position relative to a vehicle fiducial (e.g., A pillar, B pillar, C pillar, console, dashboard, etc.) as the steering wheel in the vehicle cabin. In another variation, the sensor data (e.g., video stream) can be processed (e.g., cropped, de-warped, sampled, mosaiced, merged, etc.) to emulate the driver's view. However, the sensor data can be otherwise provided to the remote operator. The teleoperation mode can additionally or alternatively include performing sensor fusion (e.g., supplementing features of sensor data collected from the sensor of one sensing subsystem with features from another sensor to produce a combined data set, which can require less bandwidth to transmit and/or improve the accuracy of the underlying data). However, the teleoperation mode can include performing any other suitable actions related to remote operation of the vehicle.

The semi-autonomous mode can include any suitable combination of teleoperation and autonomous modes of operation. For example, the semi-autonomous mode can include capturing low resolution video data and streaming the captured data to a teleoperator, as well as collecting high resolution video data and combining it with radar data in order to recognize lane edges, surrounding vehicles, and other objects and superimpose the recognized features as graphics on the video stream provided to the teleoperator in order to aid the teleoperator in controlling the vehicle.

However, the sensor subsystem can be otherwise suitably operable between any suitable operating modes.

4. Method

Figure 6:
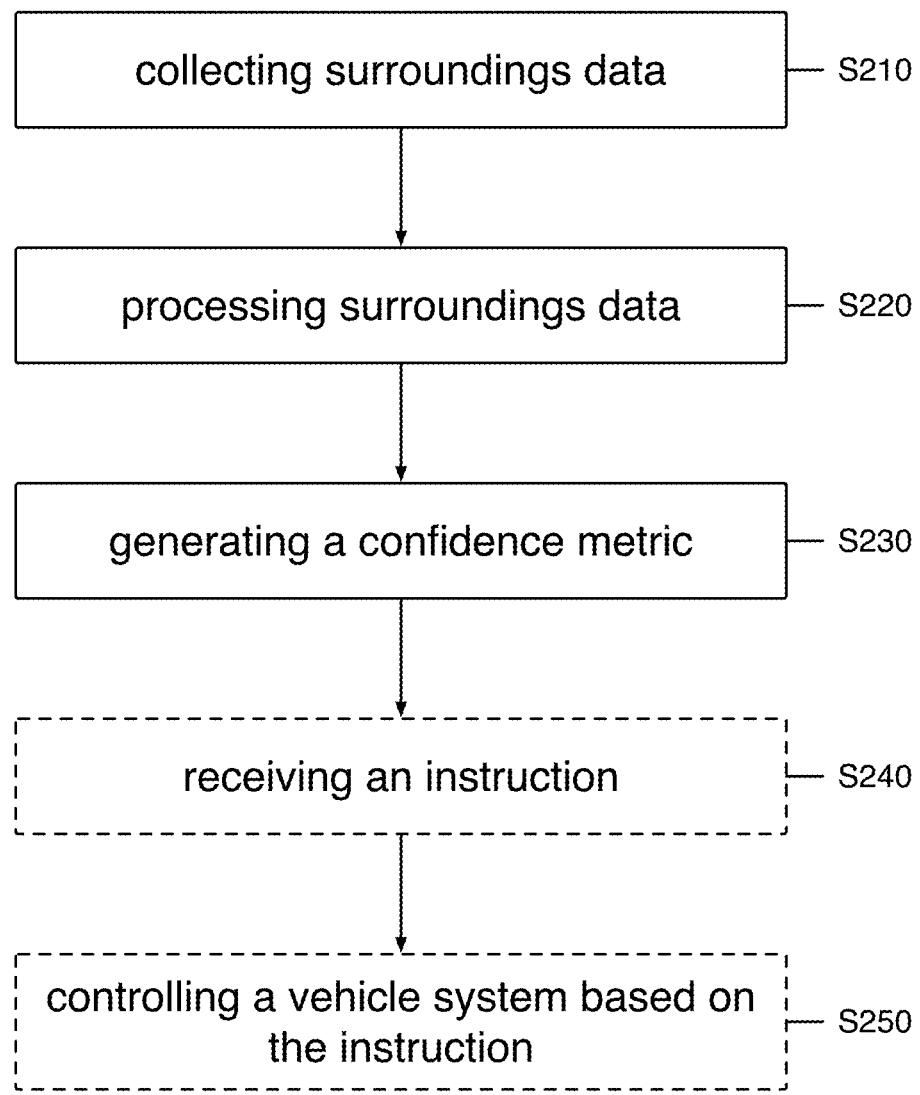
FIG. 6 is a flow chart of an embodiment of a method of use of the system.

As shown in FIG. 6, the method 200 for using a vehicle system (e.g., as described above in Section 3, a system 100, etc.) includes: collecting surroundings data S210; processing surroundings data S220; and generating a confidence metric S230. The method 200 can optionally include: receiving an instruction S240; and, controlling a vehicle system based on the instruction S250. The method 200 functions to enable autonomous, semi-autonomous, and remote operation of a vehicle.

4.1 Collecting Surroundings Data

Block S210 includes: collecting surroundings data. Block S210 functions to perceive the surroundings (e.g., local environment, roadway within a fixed radius of the vehicle, three-dimensional space within a variable radius of the vehicle, etc.) of the vehicle for subsequent processing and/or determination in accordance with various Blocks of the method 200. Block S210 preferably includes collecting surroundings data including both image data and range data; however, Block S210 can additionally or alternatively include collecting either image data or range data.

Collecting surroundings data can be performed at any one or more of an image sensor, a rangefinder, and a supplementary sensor. The image sensor is preferably an image sensor substantially as described above in Section 3, but can additionally or alternatively include any suitable image sensor. The rangefinder is preferably a rangefinder substantially as described above in Section 3, but can additionally or alternatively include any suitable rangefinder. The supplementary sensor is preferably a supplementary sensor substantially as described above in Section 3, but can additionally or alternatively be any suitable supplementary sensor.

In a variation, Block S210 includes collecting image data (e.g., a video stream, an image sequence, etc.). In this variation, Block S210 is preferably implemented using one or more image sensors as described above in Section 3, but can additionally or alternatively be implemented using any suitable image sensor. Accordingly, Block S210 preferably includes collecting a video stream at a camera defining an AFOV and having a defined orientation, but can additionally or alternatively include collecting image data in any other suitable manner. In this variation, Block S210 can include collecting image data corresponding to any suitable number of image sensors (e.g., two, four, eight, etc.) having any suitable AFOV oriented in any suitable direction. For example, Block S210 can include: collecting a first video stream at a first camera arranged external to a cabin of the vehicle, the first camera having a first angular field of view (AFOV) oriented toward a forward direction relative to the vehicle; collecting a second video stream at a second camera arranged within the cabin along a longitudinal centerline of the cabin, the second camera having a second AFOV oriented toward the forward direction, wherein the second AFOV is narrower than the first AFOV; collecting a third video stream at a third camera arranged external to the cabin, the third camera having a third AFOV oriented toward a side direction relative to the vehicle, wherein the third AFOV is wider than the first AFOV; and collecting a fourth video stream at a fourth camera adjacent to the third camera, the fourth camera having a fourth AFOV oriented toward a rear direction relative to the vehicle, wherein the fourth AFOV is narrower than the first AFOV. However, in this variation and related variations Block S210 can include otherwise suitably collecting image data.

In another variation, Block S210 includes collecting range data (e.g., a range data stream). In this variation, Block S210 is preferably implemented using one or more rangefinders as described above in Section 3, but can additionally or alternatively be implemented using any suitable rangefinder. Accordingly, Block S210 preferably includes collecting a range data stream at a rangefinder defining a field of view and having a defined orientation, but can additionally or alternatively include collecting range data in any other suitable manner. In variations, the range data stream can be integrated such that the collected range data stream includes a total field of view that encompasses any suitable field(s) of view (e.g., multiple fields of view/AFOVs of a plurality of image sensors); for example, the range data stream can be collected from a rotating sensor (e.g., lidar, radar) that perceives a full 360° view around the vehicle, which includes a plurality of AFOVs corresponding to various image sensors wherein each AFOV is less than 360°. However, in this variation Block S210 can include otherwise suitably collecting range data.

4.2 Processing Surroundings Data

Block S220 includes: processing collected surroundings data. Block S220 functions to extract characteristics of the surroundings from the surroundings data. Block S220 can also function to transform the surroundings data to make the data suited for downstream processing (e.g., compress the data, remove unnecessary portions of the data, denoise the data, etc.). Block S220 is preferably performed at the onboard computing module of a vehicle capable of autonomous, semi-autonomous, and/or remote operation, but can be otherwise suitably performed by any computing system. Block S220 can include multiple instances of data processing, in parallel and/or in series. For example, Block S220 can include processing image data and range data in parallel processing streams (e.g., contemporaneously, simultaneously, asynchronously, etc.), and preparing the separate processing streams for downstream combination into a single processed data stream (e.g., at a scoring module, in generating a comparison as in Block S230, etc.). Data streams (e.g., video streams, range data streams, etc.) can be processed simultaneously (e.g., at differing processing modules), serially (e.g., first at a CPU and subsequently at a GPU cluster), or otherwise suitably processed. Irrespective of the surroundings data input type (e.g., image data, range data, supplementary data, etc.), Block S220 preferably generates one or more outputs as described below. However, surroundings data can be otherwise suitably processed in accordance with Block S220.

In a variation, Block S220 includes processing image data (e.g., collected as in one or more variations of Block S210). Block S220 is preferably implemented at one or more onboard processing modules of the onboard computing system as described in Section 3, but can additionally or alternatively be implemented using any suitable processing module(s). Accordingly, Block S220 preferably includes simultaneously processing one or more video streams at a CPU and a GPU cluster arranged within the vehicle cabin to generate a plurality of object localization datasets (e.g., from which a confidence metric can be generated as in Block S230). For example, Block S220 can include processing a first video stream collected via a first camera (e.g., front facing in-cabin camera, teleoperation camera, overhead stereocameras, etc.) at a CPU according to a set of rules (e.g., a gradient-based feature descriptor such as HOG, an edge-detection transform, any other suitable linear or nonlinear deterministic image transform, etc.) and processing a second video stream collected via a second camera (e.g., exterior rear-facing side cameras, teleoperation camera, overhead stereocameras, front facing in-cabin camera, same or different camera as the first camera, etc.) at a GPU cluster according to a trained deep-learning object detection model. In another example, Block S220 can include processing the first video stream at the CPU and a combination of the first and second video streams at the GPU cluster simultaneously (e.g., in parallel, substantially simultaneously, contemporaneously, etc.). However, Block S220 can additionally or alternatively include processing image data in any suitable manner. In a related variation, Block S220 can include processing range data in lieu of image data in a similar parallel architecture as described above.

In relation to image data, Block S220 can include determining static portions and dynamic portions of image data (e.g., video streams). A static portion of image data is preferably a first set of data points (e.g., pixels) in the image data wherein the value (e.g., intensity, hue, etc.) is substantially static (e.g., temporally, between image frames, within a threshold temporal variance, etc.) compared to a second set of data points (e.g., pixels) in the image data. The second set of data points preferably defines the dynamic portion of the image data. Static portions of the image data can additionally or alternatively include portions that depict less useful, less usable, and/or useless information (e.g., in relation to vehicle control, teleoperation, etc.) irrespective of the temporal variance of the data points in the static portion; for example, static portions can include interior views of the cabin that are alternately brightly lit and shadowed but do not include regions (e.g., exterior windows) through which a foreign vehicle or other object could be viewed by the camera. Static portions of the image preferably include interior views of the cabin, inner surfaces of the vehicle, and the like, and exclude exterior regions of the vehicle surroundings in which foreign vehicles, lane lines, and any other objects can appear. Static portions can additionally or alternatively include exterior regions that are substantially unlikely to (e.g., cannot) host land vehicles (e.g., regions that are a above a horizon line by a threshold distance), irrespective of the temporal variance of the data points (e.g., pixels) in the region. However, the static and dynamic portions can include or exclude any other suitable portions of the image data, and/or be otherwise suitably defined. Static and/or dynamic portions are preferably determined automatically by the onboard computing system, but can be otherwise suitably determined.

In relation to static and dynamic portions of image data, Block S220 can include eliminating (e.g., removing, overwriting, ignoring, etc.) the static portion of the image data prior to further processing the image data, which functions to reduce computing resource requirements while processing image data. Eliminating the static portion is preferably performed prior to further processing the image data (e.g., at the CPU, at the GPU cluster, to generate an output parameter, combining video streams, etc.), but can additionally or alternatively be performed after further processing, midway through further processing steps, and/or at any other suitable time.

In variations, Block S220 can include processing range data (e.g., a range data stream). Processing range data preferably includes extracting an object signature from the range data, wherein the object signature indicates the presence and extent of a nearest surface of the object relative to the vehicle (e.g., a projected surface normal to the shortest distance vector between the vehicle and the rangefinder from which the range data is collected). For examples wherein the range data is radar data, processing the range data can include extracting the object signature based on the range data stream and a radar cross section of the object (e.g., a known cross section, a predicted cross section, an inferred cross section, etc.). For examples wherein the range data is lidar data from a two-dimensional viewing area (e.g., via scanning lidar, non-scanning areal lidar, multiple single-point laser rangefinders in a two-dimensional array, etc.), Block S220 can include calculating a projected area of the object in extracting the object signature. For examples wherein the range data includes a point cloud, extracting the object signature can include determining a set of points within the point cloud that correspond to one or more surfaces of the object. However, determining the object signature based on range data can be otherwise suitably performed.

In relation to Block S220, processing surroundings data produces at least one output. The output can include any one or more of: an object localization dataset (e.g., data describing the physical location in three-dimensional space of an object perceived within the surroundings data), an object classification dataset (e.g., the object class and/or any subclasses to which an object belongs), an object detection dataset (e.g., information indicative of the presence of one or more objects distinct from background signal in the surroundings data), a feature dataset (e.g., one or more two-dimensional image features extracted from the surroundings data wherein the surroundings data includes image data), an object signature (e.g., object localization obtained from range data such as radar, lidar, etc.), environmental data (e.g., ambient light levels, ambient temperature levels, acoustic characteristics of the environment, road surface properties, etc.), and any other suitable output resulting from processing surroundings data collected by any suitable sensors. The output can be determined from (e.g., extracted from, derived from, based on, etc.) image data, range data, data collected at one or more supplementary sensors (e.g., supplementary data), and any other suitable surroundings data for processing.

In a specific example, the object localization dataset includes a lane location dataset. The lane location dataset includes the set of positions in three-dimensional space occupied by the one or more lines that define a lane on a roadway, and the relative positions of each of the set of positions to the vehicle. The lane location dataset can be used to locate the vehicle within the lane (e.g., centered in the lane, biased to the left or right side of the lane, the normalized lateral coordinate of the vehicle within the lane between the left extreme and right extreme of the lane, etc.), to determine that the vehicle is within the lane (e.g., as in a binary determination between "in lane" and "out of lane"), to localize the vehicle during a transition between a first lane and a second lane, to localize a foreign vehicle within a lane and/or relative to the vehicle based on lane localization (e.g., via projection, via orthographic inversion, etc.), and for any other suitable purpose.

In another specific example, the object localization dataset includes a foreign vehicle location. The foreign vehicle location preferably defines the region in three-dimensional space occupied by a foreign vehicle (e.g., a vehicle other than the primary vehicle), and/or the position of the primary vehicle in relation to the foreign vehicle. In a related specific example, the object signature (e.g., based on a rangefinder output, a range data stream, a range dataset, etc.) includes the foreign vehicle location, preferably similarly defined as above.

4.3 Generating a Confidence Metric

Block S230 includes: generating a confidence metric based on an output of processing the surroundings data (e.g., as in one or more variations of Block S220). Block S230 is preferably performed by and/or implemented at the onboard computing module as described in Section 3, but can additionally or alternatively be performed at any suitable computing system and/or by any suitable entity (e.g., a remote computing system, a remote operator or teleoperator, etc.).

The confidence metric can be any suitable metric describing confidence in the quality of the surroundings data. The quality of the surroundings data is preferably related to the usability of the surroundings data for localization, mapping, and/or control of the vehicle, but can additionally or alternatively be any other suitable quality of the data (e.g., consistency, transmittability, processability, etc.). The confidence metric is preferably expressed as a quantified confidence (e.g., 50% confident, 90% confident, 5% confident, etc.), but can additionally or alternatively be expressed as a binary confidence (e.g., confident or not confident), a qualitative confidence (e.g., very confident, somewhat confident, not at all confident, etc.), and/or by any other suitable expression. The confidence metric can describe the entirety of the data (e.g., all collected surroundings data), specific features within the data (e.g., extracted objects, determined object localization parameters, etc.), types of surroundings data (e.g., a higher confidence in range data than image data), and any other suitable portion or aspect of the surroundings data. Variations of Block S230 can include generating a plurality of confidence metrics, each metric associated with a distinct data characteristic; for example, Block S230 can include generating a first confidence metric associated with the transmissibility (e.g., ability to transmit) of the data, a second confidence metric associated with the processability (e.g., ability to process and/or extract object parameters as in Block S220) of the data, and a third confidence metric associated with the quality of the surroundings data (e.g., the spatial resolution, the temporal resolution, etc.) in relation to control of the vehicle and/or perception of the surroundings. The confidence metric can be generated based on one or more outputs of one or more variations of Block S220 (e.g., a comparison between a first and second output, an object localization parameter, an object signature, etc.), and/or otherwise suitably generated.

In a variation, Block S230 includes generating a comparison between a first output and a second output of the processing of surroundings data. For example, the first output can include a first object localization dataset resulting from processing a first image dataset at a first processing module (e.g., a CPU) and the second output can include a second object localization dataset resulting from processing a second image dataset at a second processing module (e.g., a GPU cluster). In another example, the first output can include a first object localization dataset resulting from processing a first image dataset at a first processing module (e.g., a CPU) and the second output can include a second object localization dataset resulting from processing a combination of the first image dataset and a second image dataset at a second processing module (e.g., a GPU cluster). However, Block S230 can include generating a comparison between any suitable outputs of the processing of surroundings data in any suitable manner. In variations of Block S230 including generating a comparison, the confidence metric is preferably generated based on the comparison, but can be otherwise suitably generated.

4.4 Receiving Operating Instructions

The method 200 can include Block S240, which includes: receiving an instruction. The instruction preferably indicates (e.g., communicates, encodes, etc.) a desired operation of one or more vehicle subsystems (e.g., sensor subsystem, communication module, onboard computing system, actuation subsystem, etc.), but can additionally or alternatively indicate the desired operation of any suitable component. Block S240 is preferably performed by and/or implemented at the onboard computing module (e.g., a control module thereof, a communication module thereof, etc.) as described in Section 3, but can additionally or alternatively be performed using any suitable computing and/or communication system. Block S240 can include receiving a teleoperation instruction (e.g., an instruction from a remote operator), an autonomous instruction (e.g., an instruction generated by an onboard computing system operating in an autonomous mode), a semi-autonomous instruction (e.g., an instruction generated by an onboard computing system in combination with another instruction and/or validation received from a supervisor), and/or any other suitable instruction. The instruction can include a plurality of instructions (e.g., an instruction set), a high-level instruction (e.g., in relation to a unified control schema, such as "change lanes", "pull over", etc.), a low-level instruction (e.g., a primitive, an analog signal, an actuator power level or operating instruction, etc.), and any other suitable instruction.

In relation to Block S240, receiving the instruction can include predicting the instruction. The instruction can be predicted based on any one or more of: historical vehicle operation data (e.g., in similar contexts to the present vehicular context, in response to similar control inputs, etc.), a predictive model for vehicle operation (e.g., a deterministic model, a probabilistic model, etc.), vehicle operation schedule (e.g., a scheduled pull-over event, a scheduled egress from a highway via an off-ramp, etc.), a predictive model for operator behavior (e.g., a deterministic control scheme that relates teleoperator behavior to future control actions, a probabilistic model that relates present teleoperator control inputs to future behavior, etc.), collected sensor streams (e.g., as in Block S210), generated confidence metrics (e.g., as in Block S230), and any other suitable basis.

4.5 Controlling a Vehicle System

The method 200 can optionally include Block S250, which includes controlling a vehicle system (e.g., the sensor system, the onboard computing subsystem, the vehicle actuation subsystem, etc.) based on the confidence metric. Block S250 functions to automatically take vehicle actions in response to characteristics of the sensor data (e.g., data quality, transmissibility, etc.).

In a specific example, Block S250 includes automatically controlling the vehicle to pull over into a shoulder region of a roadway on which the vehicle is traveling, based on the confidence metric; maintaining a stationary position of the vehicle in the shoulder region for a predetermined time interval (e.g., time period); and, automatically resuming travel on the roadway. Controlling the vehicle to pull over can include determining that a shoulder region exists, that the shoulder region is suitable for pulling over the vehicle (e.g., sufficiently wide, sufficiently well-paved, sufficiently free of debris, etc.), decelerating and laterally moving the vehicle to the shoulder region, and any other suitable activities. Maintaining the stationary position of the vehicle preferably includes maintaining operation of the vehicle in the autonomous mode and ceasing locomotion only (e.g., continuing sensor data collection and/or processing), but can additionally or alternatively include placing any suitable subsystem of the vehicle into the off-state (e.g., the ignition, the sensor subsystem, the onboard computing system, etc.), and/or operating the vehicle in any suitable mode (e.g., the supervised autonomy mode, semi-autonomous mode, remote operation or teleoperation mode, etc.). Automatically resuming travel preferably includes determining that the roadway is devoid of traffic in the closest travel lane (e.g., the rightmost lane adjacent to the shoulder) within a predetermined rearward-facing distance (e.g., based on a known acceleration capability of the vehicle) and pulling the vehicle out into the roadway and accelerating to travel speed (e.g., the speed limit for a commercial truck, the speed limit for a passenger vehicle, etc.) in autonomous mode, but can additionally or alternatively include resuming vehicular travel in any suitable manner.

Block S250 can include controlling one or more sensors (e.g., image sensors, cameras, radars, etc.) based on the confidence metric (e.g., based on the confidence metric exceeding a threshold value, falling below a threshold value, etc.).

In a variation, Block S250 can include adjusting an orientation of an image sensor (e.g., a camera, a stereocamera, etc.). In this variation, adjusting the orientation of the image sensor is preferably based on an instruction received from a remote operator (e.g., as in Block S240), but can additionally or alternatively be based on an instruction received from an onboard computing system, and/or have any other suitable basis. In a specific example, this variation includes adjusting the orientation of the image sensor based on a measured head orientation of a teleoperator remote from the vehicle (e.g., transduced at a gyroscope-enabled headset worn by the teleoperator). In this example, the AFOV of the image sensor preferably tracks the desired AFOV inherently requested (e.g., instructed) by the teleoperator by moving his or her head. However, the orientation of the image sensor can be otherwise suitably adjusted (or maintained in a stationary position) based on any suitable instruction.

In another variation, Block S250 can include adjusting a detectability range (e.g., focal length of an image sensor, effective range of a rangefinder, etc.) of a sensor of the vehicle. In a specific example of this variation, Block S250 includes determining a longitudinal extent (e.g., a length) of the vehicle and/or a portion thereof (e.g., a trailer 950 of the vehicle), and adjusting a focal length of a rear-facing camera based on the determined longitudinal extent (e.g., in order to extend the detectability range to include the longitudinal rearward extent and exclude the rearward extent beyond a predetermined distance behind the vehicle). However, in this variation Block S250 can include otherwise suitably adjusting a detectability range of any suitable vehicle sensor.

However, Block S250 can additionally or alternatively include controlling any suitable parameter of one or more sensors (e.g., on-state, off-state, whether the output is processed at a processing module, etc.) based on the confidence metric.

In an example of Blocks S240 and S250, Block S240 includes receiving a navigation instruction indicative of vehicle motion towards a side direction (e.g., away from an opposing side direction), and Block S250 includes, in response to receiving the navigation instruction, ceasing collection and/or onboard processing of sensor data corresponding to the opposing side direction. In this example, ceasing collection of sensor data from sensors on the opposing side to the direction of vehicle movement can function to decrease data collection, data processing, and/or data transmission requirements (e.g., due to a reduced requirement for sensor data from the side of the vehicle away from which the vehicle is moving). In related examples, ceasing processing of sensor data (e.g., at each processing module, at a subset of processing modules, etc.) can function to reduce onboard computational resource usage (e.g., at a CPU, at a GPU cluster, at a radar signature tracking module, etc.) by eliminating the processing of redundant and/or unnecessary sensor data.

In a specific example, the method 200 includes monitoring control inputs. For example, the method 200 can include: at a control monitoring module (e.g., similar to the control monitoring module described above), monitoring the force applied to the gas and/or brake pedals as a function of time (e.g., by an in-situ driver, a teleoperator by way of an actuation subsystem, an autonomous system by way of an actuation system, etc.). However, the method 200 can include monitoring control inputs to the vehicle in any suitable manner.

The systems and/or methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and/or method blocks.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

What is claimed is:

1. A system for facilitating autonomous, semi-autonomous, and remote operation of a vehicle, comprising:
   a first forward camera that outputs a first video stream, wherein the first forward camera defines a first angular field of view (AFOV) and a first focal length (FL);
   a second forward camera that outputs a second video stream, wherein the second forward camera defines a second AFOV narrower than the first AFOV;

a forward radar module that outputs a first object signature;

an onboard computing subsystem, arranged at the vehicle, comprising:
a central processing unit (CPU) that continuously processes the first video stream and outputs a first object localization dataset according to a set of explicitly programmed rules,
a graphical processing unit (GPU) that continuously processes the first video stream and the second video stream, in parallel to and simultaneously with the CPU, and outputs a second object localization dataset based on a trained machine-learning model, and
a scoring module that generates a first comparison between the first object localization dataset and the second object localization dataset, and outputs a confidence metric based on the comparison and the first object signature, wherein the confidence metric is indicative of the usability of the first and second video streams for at least one of localization, mapping and control of the vehicle;
wherein the onboard computing subsystem controls at least one of the first forward camera, the second forward camera, and the forward radar module based on the confidence metric.

2. The system of claim 1, further comprising:
a side camera, coupled at a side of the vehicle and defining a third AFOV oriented toward a rear direction relative to the vehicle, and operable between an on-state and an off-state, wherein in the on-state the side camera outputs a third video stream and in the off-state the side camera is inoperative;
wherein the CPU processes the third video stream and the first video stream simultaneously during operation of the side camera in the on-state to output the first object localization dataset.

3. The system of claim 2, wherein the onboard computing system automatically operates the side camera in the off-state in response to vehicle motion away from the side direction.

4. The system of claim 2, further comprising a side radar module that outputs a second object signature, and wherein the scoring module outputs the confidence metric based on the second object signature.

5. The system of claim 4, wherein the side camera is mounted to a mirror stem at the side of the vehicle, and wherein the side radar module is mounted at an external surface of the vehicle below a door at the side of the vehicle.

6. The system of claim 1, wherein the first object localization dataset comprises a first foreign vehicle location and the second object localization dataset comprises a second foreign vehicle location.

7. The system of claim 1, wherein at least one of the first forward camera and the second forward camera comprises a stereocamera.

8. The system of claim 1, wherein the first forward camera is arranged exterior to a cabin of the vehicle superior to a windshield of the vehicle and aligned along a centerline of a longitudinal axis of the cabin, wherein the second forward camera is arranged interior to the cabin proximal an upper portion of the windshield and aligned along the centerline, and wherein the forward radar module is coupled to an exterior surface of the vehicle and defines a first ranging length greater than the first FL.

9. The system of claim 1, further comprising an alert module that outputs an alert signature based on the confidence metric exceeding a threshold value, wherein the alert signature comprises at least one of a visible signature and an audible signature.

10. A method for facilitating autonomous, semi-autonomous, and remote operation of a vehicle, comprising:
collecting a first video stream at a first camera defining a first angular field of view (AFOV) oriented toward a forward direction relative to the vehicle;
collecting a second video stream at a second camera defining a second AFOV oriented toward the forward direction;
processing the first video stream at a central processing unit (CPU) arranged within the cabin to extract a first object localization dataset according to an explicitly programmed set of rules;
processing a combination of the first and second video stream at a graphical processing unit (GPU) arranged within the cabin to extract a second object localization dataset according to a trained machine-learning model, simultaneously with processing the first video stream;
generating a comparison between the first object localization dataset and the second object localization dataset;
generating a confidence metric based on the comparison, wherein the confidence metric is indicative of the usability of the first and second video streams for at least one of localization, mapping and control of the vehicle; and
performing a control action based on the confidence metric.

11. The method of claim 10, further comprising:
collecting a third video stream at a third camera defining a third AFOV oriented toward a side direction relative to the vehicle; and
processing the third video stream at the CPU contemporaneously with processing the first video stream to extract the first object localization dataset.

12. The method of claim 11, wherein the first forward camera is arranged exterior to a cabin of the vehicle superior to a windshield of the vehicle and aligned along a centerline of a longitudinal axis of the cabin, wherein the second forward camera is arranged interior to the cabin proximal an upper portion of the windshield and aligned along the centerline, and wherein the third camera is arranged external to the cabin.

13. The method of claim 11, further comprising:
collecting a fourth video stream at a fourth camera defining a fourth AFOV oriented toward a rear direction relative to the vehicle; and
processing the fourth video stream at the GPU contemporaneously with processing the combination of the first and second video streams to extract the second object localization dataset.

14. The method of claim 13, wherein the second AFOV is narrower than the first AFOV, wherein the third AFOV is wider than the first AFOV, and wherein the fourth AFOV is narrower than the first AFOV.

15. The method of claim 10, wherein performing the control action comprises controlling at least one of the first camera and the second camera based on the confidence metric.

16. The method of claim 10, wherein the first object localization dataset comprises a first lane location dataset, and wherein the second object localization dataset comprises a second lane location dataset.

17. The method of claim 10, wherein at least one of the first camera and the second camera comprises a stereocamera.

18. The method of claim 10, further comprising determining a first static portion of the first video stream and a second static portion of the second video stream, eliminating the first static portion of the first video stream prior to processing the first video stream, and eliminating the second static portion of the second video stream prior to processing the combination of the first video stream and the second video stream.

19. The method of claim 10, further comprising:
   collecting a range data stream at a set of rangefinders defining a total field of view including the first, second, third, and fourth fields of view;
   extracting an object signature from the range data stream; and
   generating the confidence metric based on the object signature.

20. The method of claim 10, further comprising automatically controlling the vehicle to pull over into a shoulder region of a roadway on which the vehicle is traveling, based on the confidence metric, holding the vehicle stationary for a predetermined time period, and automatically resuming travel on the roadway.

* * * * *